United States Patent [19]

Ideta et al.

[11] Patent Number: 4,990,126
[45] Date of Patent: Feb. 5, 1991

[54] CONTINUOUSLY VARIABLE TRANSMISSION

[75] Inventors: Yasufumi Ideta, Ayase; Hiromi Taguchi, Zama, both of Japan

[73] Assignee: Nissan Motor Co., Ltd., Yokohama, Japan

[21] Appl. No.: 260,216

[22] Filed: Oct. 20, 1988

[30] Foreign Application Priority Data

Oct. 23, 1987 [JP] Japan .................. 62-266229

[51] Int. Cl.⁵ .............................. F16H 37/08
[52] U.S. Cl. .................... 475/210; 475/219; 74/606 R
[58] Field of Search ........... 74/689, 700, 701, 606 R, 74/606 A, 469; 474/144, 146; 475/210, 219

[56] References Cited

U.S. PATENT DOCUMENTS

| 1,876,948 | 9/1932 | Jahnke | 184/6.5 |
|---|---|---|---|
| 2,984,122 | 5/1961 | Woolley | 74/606 R |
| 4,240,524 | 12/1980 | Katayama et al. | 74/467 X |
| 4,274,303 | 6/1981 | Shindo et al. | 74/606 R X |
| 4,548,100 | 10/1985 | Höhn | 74/689 |
| 4,619,157 | 10/1986 | Sakai | 74/689 |
| 4,640,152 | 2/1987 | Quick et al. | 74/606 R |
| 4,736,652 | 4/1988 | Shimamoto | 74/665 |
| 4,787,267 | 11/1988 | Kessler et al. | 74/606 R |

FOREIGN PATENT DOCUMENTS

| 3319523 | 11/1984 | Fed. Rep. of Germany . | |
| 2584159 | 1/1987 | France . | |
| 58-67158 | 5/1983 | Japan . | |
| 58-69141 | 5/1983 | Japan . | |
| 58-174754 | 10/1983 | Japan . | |
| 2064686 | 6/1981 | United Kingdom | 74/689 |

Primary Examiner—Dwight Diehl
Attorney, Agent, or Firm—Foley & Lardner, Schwartz, Jeffery, Schwaab, Mack, Blumenthal & Evans

[57] ABSTRACT

A chamber having therein a V-belt type continuously variable transmission is separated from another chamber having therein a differential mechanism. These chambers, however, are in fluid communication with an oil pan via generally vertical holes.

3 Claims, 5 Drawing Sheets

CONTINUOUSLY VARIABLE TRANSMISSION

BACKGROUND OF THE INVENTION

The present invention relates to a continuously variable transmission, and more particularly to a continuously variable transmission using a V-belt as a power transmission belt.

A so-called V-belt type continuously variable transmission is known and one example is disclosed in JP No. 58-174754. This known transmission comprises an electromagnetic clutch, a V-belt power transmission mechanism, a forward/reverse selector mechanism, and a differential mechanism. Torque from an engine is transmitted to the forward/reverse selector mechanism, V-belt power transmission mechanism, and differential mechanism in this order. The component parts other than the electromagnetic clutch are arranged within a single chamber defined by a casing. The V-belt type continuously variable transmission uses a V-belt. The V-belt is composed of a number of blocks, each having a frictional surface, assembled on the endless belt.

However, the V-belt type continuously variable transmission mentioned as above has a potential problem that the blocks separated from the V-belt might come into engagement with the differential mechanism should the V-belt be broken. If the differential mechanism locks owing to the blocks, the road wheels drivingly connected thereto will lock. The V-belt may be broken owing to inconvenience caused during its production or an excessively large stress which it is subject to although it is designed to possess a sufficiently long endurability. When the endless band of the V-belt is broken, the blocks are thrown away from the band. If the blocks separated from the band come into engagement with the differential mechanism, the differential mechanism locks. This causes the wheels to lock, causing the vehicle to spin. Therefore, if the V-belt is broken, not only can the vehicle not continue running, but also the vehicle becomes out of control.

An object of the present invention is to solve these problems.

More particularly, an object of the present invention is to improve the V-belt type continuously variable transmission such that even if the V-belt is broken, the differential mechanism will not lock.

SUMMARY OF THE INVENTION

The above-mentioned problems have been solved according to the present invention by separating a chamber where a V-belt power transmission mechanism is arranged from a chamber where a differential mechanism is arranged. More specifically, in the continuously variable transmission according to the present invention, the chamber where the V-belt power transmission mechanism is arranged is separated from the chamber where the differential mechanism is arranged by a partition wall of a casing. The casing includes a control valve assembly secured to the casing at a predetermined mounting site. The two chambers are in fluid communication with the inside of an oil pan via generally vertical holes, respectively. The control valve assembly is positioned between the holes thereby preventing blocks from entering the second chamber area where the differential mechanism is located upon breakage of the V-belt.

In one form of the present invention, a continuously variable transmission includes
a casing having a first chamber, a second chamber, and a partition wall arranged to separate said second chamber from said first chamber;
a V-belt power transmission mechanism including a V-belt drivingly the interconnecting driver and follower pulleys, the V-belt type continuously variable transmission mechanism being arranged within the first chamber,
a differential mechanism arranged within the second chamber,
an oil pan connected to said casing;
said casing having first hole means for providing fluid communication between the first chamber and the oil pan, second hole means for providing fluid communication between the second chamber and the oil pan, the oil pan containing a quantity of oil with the V-belt transmission mechanism and the differential mechanism both using the oil contained in the oil pan. The casings having a predetermined site and a control valve assembly secured to the casing and the predetermined mounting site and disposed between the first and second hole means, the control valve assembly having first wall means extending from the first hole means toward the oil pan and second wall means extending from the second hole means toward the oil pan.

DETAILED DESCRIPTION OF THE INVENTION

Figure 1:
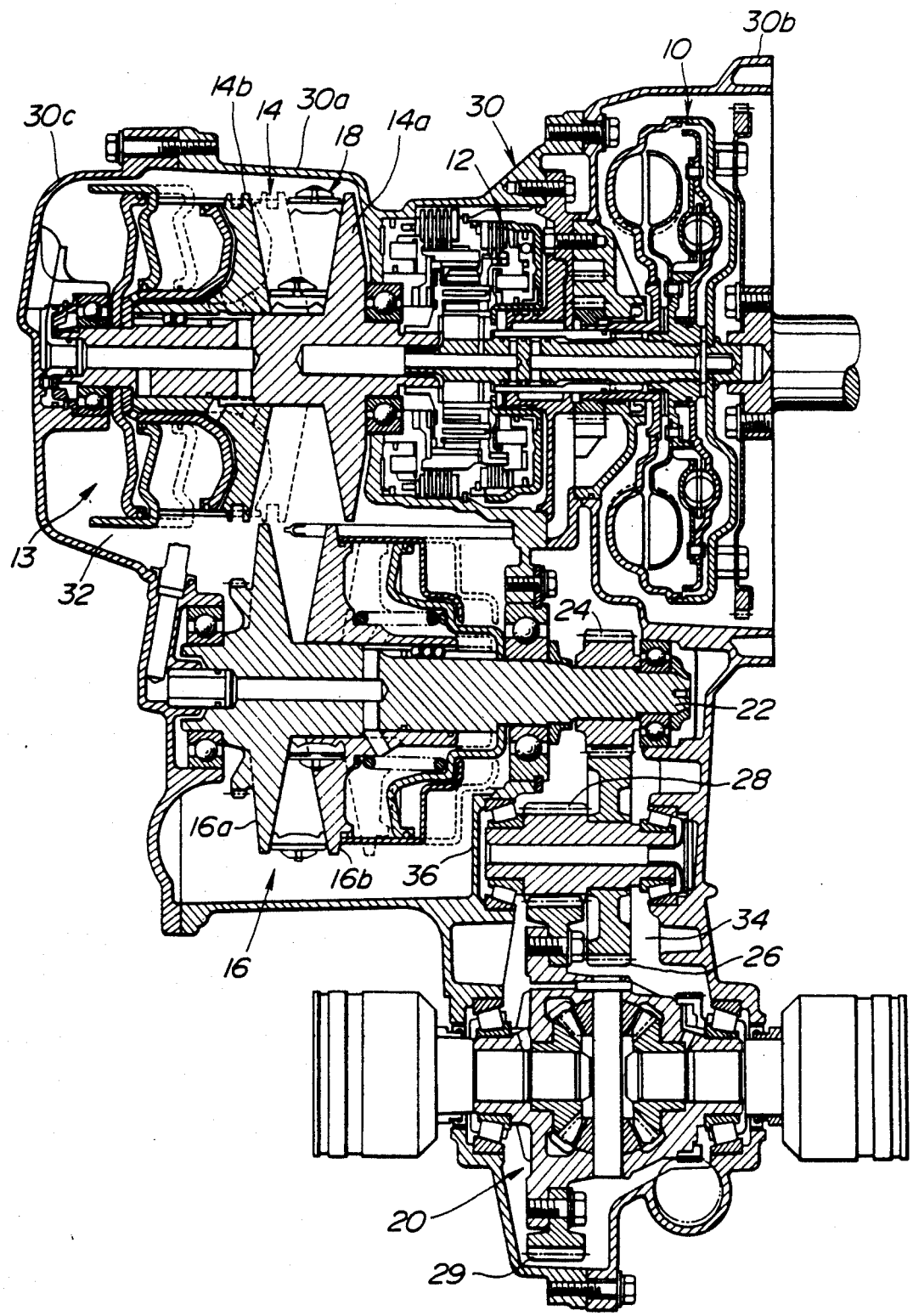
FIG. 1 is a sectional view of a V-belt type continuously variable transmission taken along lines to show the inside of a casing with component parts in an operatively associated manner.
Figure 2:
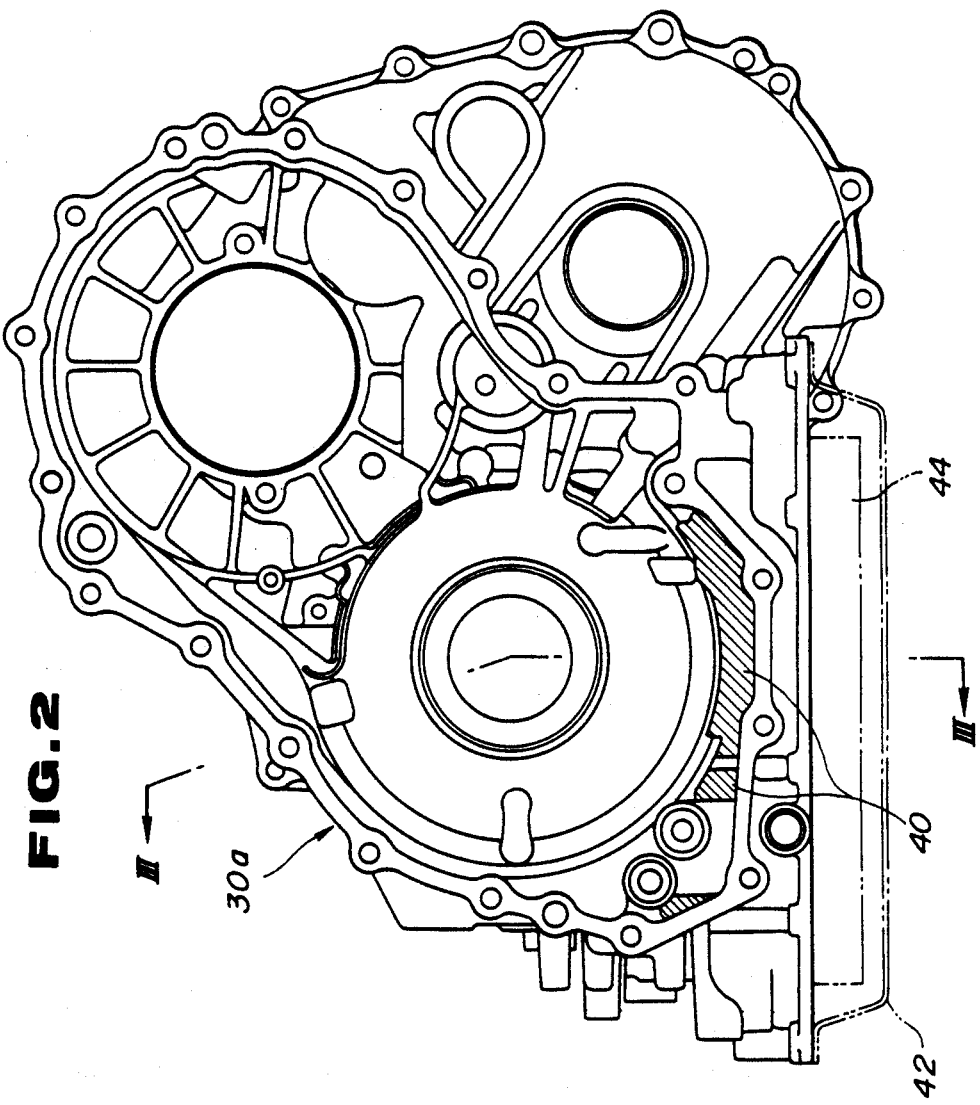
FIG. 2 is an axial end view of a main body as viewing a casing from a cover side with the cover removed.
Figure 3:
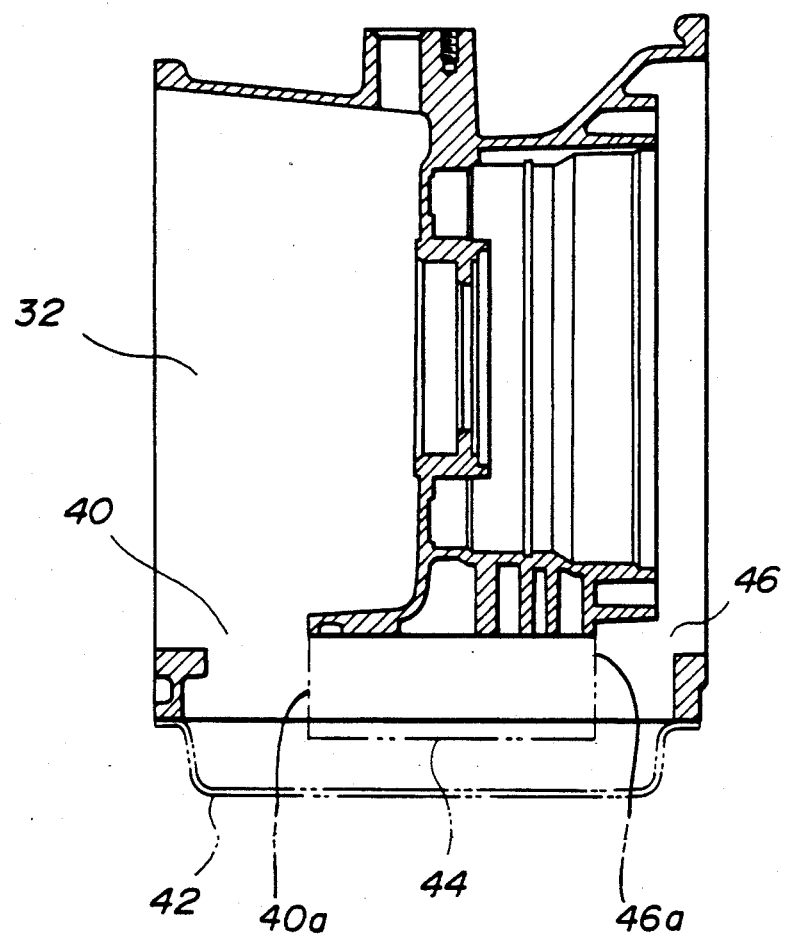
FIG. 3 is a fragmentary section taken along the line III—III of FIG. 2.
Figure 4:
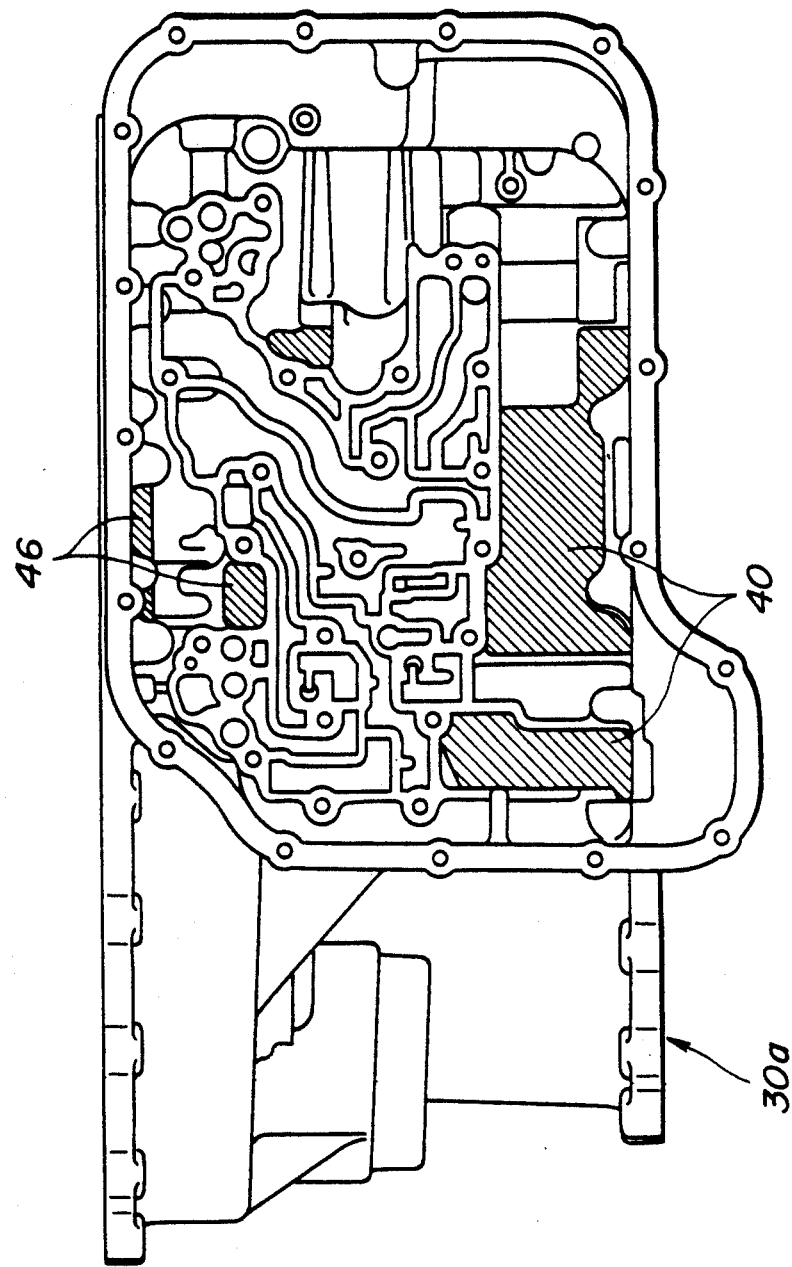
FIG. 4 is a fragementary bottom view as viewed along an arrow IV in FIG. 5.
Figure 5:
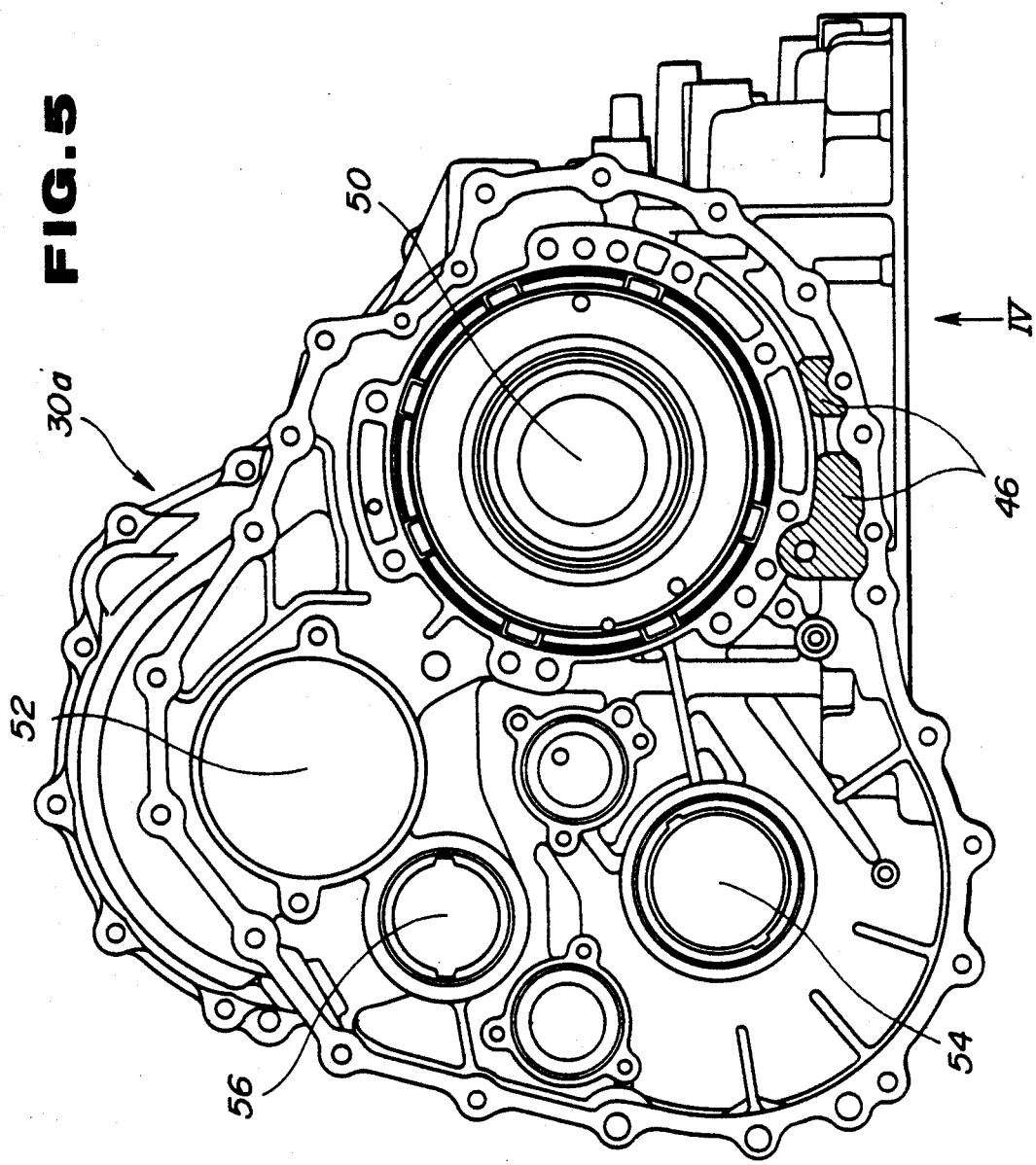
FIG. 5 is an axial end view of the main body as viewing the casing from a housing side.

Referring to FIG. 1, a continuously variable transmission comprises a fluid coupling 10 which a torque from an engine is fed, a forward/reverse selector mechanism 12 including clutch and brake and a planetary gear set, a V-belt power transmission mechanism 13, and a differential mechanism 20. The V-belt power transmission mechanism 13 includes a driver pulley 14, a follower pulley 16 and a V-belt 18 drivingly interconnecting these pulleys. Torque from the engine is delivered to the fluid coupling 10, forward/reverse selector mechanism 12, driver pulley 14, V-belt 18, follower pulley 16, and differential mechanism 20 in this order. The driver pulley 14 includes an axially fixed conical part 14a, and an axially movable conical part 14b such that the spacing of a V-shaped groove defined between these conical parts is variable by axially moving the axially movable conical part 14b. Likewise, the follower pulley 16 includes an axially fixed conical part 16a, and an axially movable conical part 16b such that the spacing of a V-shaped groove defined between these conical parts is variable by axially moving the axially movable conical part 16b. The V-belt 18 is an assembly of a number of blocks assembled along the entire length of an endless band as shown in JP-U No. 58-69141. Integral with the axially fixed conical part 16b is a follower shaft 22. The follwer shaft 22 is drivingly connected via gears 24, 26, and 28 with a final gear 29 of the differential mechanism 20. The forward/reverse selector mechanism 12, V-belt type continuously variable transmission mechanism 13, differential mechanism 20 are contained by a casing 30. The casing 30 is an assembly of a main body 30a, a housing 30b, and a cover 30c which are secured one after another by bolts. The main body 30a has a partition wall 36 which separates a chamber 32 where the V-belt type continuously variable transmission 13 is arranged from another chamber 34 where the differential mechanism 20, gears 24, 26, 28, and 29 are arranged. However, these chambers 32 and 34 are not completely separated from each other, but they are communicating with the inside a common oil pan secured to the casing. That is, as shown in FIGS. 2 and 3, there are shown generally vertical holes or passages 40 communicating with the chamber 32. As shown in FIGS. 3 and 4, the holes 40 communicate also with the inside of the oil pan 42. Secured to the casing and arranged within the oil pan 42 is a control valve assembly 44. As shown in FIG. 3, the control valve assembly is positioned between vertical holes 40 and 46. The control valve assembly also has first walls 40a extending from the holes 40 and second walls 46a extending from holes 46. As shown in FIG. 5, there are shown generally vertical holes or passages 46 communicating with the chamber 34. These holes 46 communicate also with the inside of the oil pan 42. In FIG. 5, the reference numeral 50 designates the center of the driver pulley 14, the reference numeral 54 designates the center of the differential mechanism 20, and the reference numeral 56 designates the center of the gear 26.

The operation of this preceding embodiment is described.

As mentioned before, the torque from the engine is delivered to the fluid coupling 10, forward/reverse selector mechanism 12, V-belt power transmission mechanism 13, and differential mechanism 20, in this order. During this power transmission, if the V-belt 18 should be broken, the separated blocks spread in different directions. However, these blocks will never enter the chamber 34. That is, the chambers 32 and 34 are separated from each other by the partition wall 36 and there are no holes formed through this wall 36 which allow the passage of each of these blocks. Furthermore, having the control valve assembly 44 positioned between the first holes 40 and the second holes 46 prevents blocks from entering chamber 34 via the second holes 46 upon breaking of the V-belt. Among all, some blocks may fall into the oil pan 42 having past through the holes 40, but the blocks that fall into the oil pan 40 will not move upward through the holes 46 into the chamber 34. Therefore, even if the V-belt 18 is broken, no blocks will enter the chamber where the differential mechanism 20 is arranged. Hence, the event that the V-belt 18 is broken will not cause the road wheels to lock although this will result in interruption of power from the engine to the road wheel.

What is claimed is:

1. In a continuously variable transmission:
    a casing having a first chamber, a second chamber, and a partition wall arranged to separate said second chamber from said first chamber;
    a V-belt power transmission mechanism including a V-belt drivingly interconnecting driver and follower pulleys, said V-belt type continuously variable transmission mechanism being arranged within said first chamber;
    a differential mechanism arranged within said second chamber;
    an oil pan secured to said casing;
    said casing having first hole means for providing fluid communication between said first chamber and said oil pan, and second hole means for providing fluid communication between said second chamber and said oil pan,
    said oil pan containing a quantity of oil,
    said V-belt power transmission mechanism and said differential mechanism both using said oil contained in said oil pan,
    said casing having a predetermined mounting site,
    a control valved assembly secured to said casing at said predetermined mounting site and disposed between said first and second hole means, said control valve assembly having first wall means extending from said first hole means toward said oil pan and second wall means extending from said second hole means toward said oil pan.

2. A continuously variable transmission as claimed in claim 1, wherein said first and second wall means extend into said oil pan.

3. A continuously variable transmission as claimed in claim 2, wherein said control valve assembly has a periphery and peripheral wall means extending to define said periphery thereof, said peripheral wall means including said first and second wall means.

* * * * *